United States Patent
Bernauer

(10) Patent No.: US 8,781,648 B2
(45) Date of Patent: Jul. 15, 2014

(54) SYSTEM FOR OPERATING MODEL VEHICLES AND A MODEL VEHICLE THEREFOR

(71) Applicant: Gebr. Faller GmbH Fabrik für Qualitaetsspielwaren, Guetenbach (DE)

(72) Inventor: Clemens Bernauer, Buchenbach (DE)

(73) Assignee: Gebr. Faller GmbH Fabrik fuer Qualitaetsspielwaren, Guetenbach (DE)

( * ) Notice: Subject to any disclaimer, the term of this patent is extended or adjusted under 35 U.S.C. 154(b) by 27 days.

(21) Appl. No.: 13/751,487

(22) Filed: Jan. 28, 2013

(65) Prior Publication Data
US 2013/0211627 A1    Aug. 15, 2013

(30) Foreign Application Priority Data
Jan. 27, 2012   (DE) ................... 20 2012 000 819 U

(51) Int. Cl.
*G06D 1/00*    (2006.01)
(52) U.S. Cl.
USPC ............................................. 701/2; 701/408
(58) Field of Classification Search
USPC ..................................... 701/2, 408
See application file for complete search history.

(56) References Cited

U.S. PATENT DOCUMENTS

| | | | |
|---|---|---|---|
| 7,489,234 B2 * | 2/2009 | Servera Serapio et al. ... | 340/435 |
| 7,768,385 B1 * | 8/2010 | Juranovich et al. ........... | 340/479 |
| 8,560,156 B2 * | 10/2013 | Kshatriya ....................... | 701/22 |
| 2003/0148698 A1 | 8/2003 | Koenig | |
| 2006/0167620 A1 * | 7/2006 | Takagi et al. ................. | 701/200 |
| 2006/0215020 A1 * | 9/2006 | Mori et al. ..................... | 348/119 |
| 2008/0053245 A1 * | 3/2008 | Yao ............................. | 73/862.08 |
| 2008/0300731 A1 * | 12/2008 | Nakajima et al. ................. | 701/1 |
| 2009/0256723 A1 * | 10/2009 | Peddie et al. ................. | 340/907 |
| 2010/0299001 A1 * | 11/2010 | Suzuki ............................. | 701/2 |
| 2010/0304640 A1 | 12/2010 | Sofman et al. | |
| 2012/0083963 A1 * | 4/2012 | Sato et al. ....................... | 701/25 |
| 2013/0311043 A1 * | 11/2013 | Kobana et al. ................. | 701/41 |

FOREIGN PATENT DOCUMENTS

| | | |
|---|---|---|
| DE | 695 06 804 T2 | 7/1995 |
| DE | 20 2004 018 425 U1 | 11/2004 |
| GB | 2 459 743 A | 5/2008 |
| WO | WO 01/15 059 A2 | 3/2001 |

\* cited by examiner

*Primary Examiner* — Hussein A. Elchanti
(74) *Attorney, Agent, or Firm* — Todd L. Juneau

(57) ABSTRACT

A system for operating model vehicles comprising at least one model vehicle having an energy self-sufficient drive and a steering axle, which, with the aid of a magnet, follows a contact wire laid directly under a road, further comprising a positioning system, a control module and a wireless communication system for transmitting information to and/or from the vehicle.

16 Claims, 1 Drawing Sheet

SYSTEM FOR OPERATING MODEL VEHICLES AND A MODEL VEHICLE THEREFOR

CROSS REFERENCE TO RELATED APPLICATIONS

This patent application claims priority to German Patent Application 20 2012 000 819.6, filed on Jan. 27, 2012.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

1. Field of the Invention

The present invention relates to a system for remotely operating model vehicles as well as a model vehicle for such a system.

Various systems for operating model vehicles are known from the prior art, for example, that known by the designation "Faller Car System" from the applicant.

2. Background of the Invention

The current state of knowledge is as follows.

Known systems for operating model vehicles have at least one model vehicle with an energy self-sufficient drive and a steering axle, which, with the aid of a magnet, follows a contact wire laid directly under a road, as well as a control module for controlling devices, which are designed similar to points, in the drive path. Systems of this type necessitate in intersection and/or turning situations that the vehicle is assigned to the designated drive path by a stationary mounted influencing device, so that, in correspondence with the drive path designated for the respective vehicle, a turning procedure for example is implemented. By providing a magnetic field sensor in the model vehicle and corresponding coils for generating magnetic fields that are oriented north and/or south and are directed perpendicular to the drive path, it is also possible to transmit additional information to the vehicle, which for example, calls up a second running mode, that means a fast or slow vehicle operation.

Switching between the two running modes then takes place upon detection of a correspondingly directed magnetic field. Such a design is disadvantageous in that only two running modes can be called up and, therefore, a driving behavior is generated for the model vehicle that is not very realistic for many application situations.

A magnetic field in antipolar alignment, for example, in the north direction, can additionally realize a further function, for example, a stopping point for the vehicle, in that an electrical supply to the model vehicle is interrupted.

Like the switching between running modes, stopping also occurs by interrupting the electrical supply for the vehicle, resulting in abrupt commands resulting in non-realistic reproductions of driving actions, such as very abrupt braking.

A further disadvantage of the system is that distance control for equalization of traffic and for preventing rear-end collisions can only be realized with relative complexity. Up until now, a stopping point in the region of the road is activated for a predetermined time by the steering magnet of a vehicle driving forwards via a magnetic field sensor, for example a reed contact, such that a following vehicle stops at this stopping point for the predetermined period of time. Using the same system, right and left controls, zebra crossings (cross walks), or merging from secondary streets onto primary roads can be emulated. However, it is disadvantageous that a significant wiring expense is necessary to implement the effects listed above, as well as a significant expense in hardware for sensors and stopping points.

The object of the present invention is to alleviate known problems from the prior art and to provide a system for operating model vehicles as well as model vehicles therefore with improved functionality and affordability.

BRIEF SUMMARY OF THE INVENTION

In a preferred embodiment, a system for operating model vehicles comprising: (i) at least one model vehicle with an energy self-sufficient drive and a steering axle, which, with the aid of a magnet, follows a contact wire laid directly under a road, (ii) a positioning system for the model vehicles, (iii) a control module, and (iv) a wireless communication system for transmitting information to the vehicle and/or from the vehicle is provided.

In another preferred embodiment, the disclosed system, wherein the positioning system has at least one signal transmitter and a plurality of signal receivers, wherein the signal transmitter is assigned to a specific model vehicle and a position of the vehicle is calculated by evaluating time differences of a signal emitted from the signal transmitter to the signal receivers.

In another preferred embodiment, the disclosed system, further comprising wherein the positioning system is based on ultrasonics.

In another preferred embodiment, the disclosed system, further comprising wherein the communication system is based on radio.

In another preferred embodiment, the disclosed system, further comprising wherein the communication system has at least one stationary component and at least one mobile component, wherein the stationary component is connected to the control module and the mobile component is assigned to a model vehicle.

In another preferred embodiment, the disclosed system, further comprising wherein the control module is connected to the positioning system and is suitably designed to link information about a road network with information from the positioning system with each other and to activate the model vehicle based on this information via the communication system.

In another preferred embodiment, the disclosed system, further comprising wherein the communication system is designed bidirectionally.

In another preferred embodiment, the disclosed system, further comprising wherein the control module is suitably designed to implement the control of the model vehicle based on information about other model vehicles.

In another preferred embodiment, the disclosed system, further comprising wherein the control module is suitably designed to activate a plurality of model vehicles.

In another preferred embodiment, the disclosed system, further comprising wherein the control module is suitably designed to transmit control commands related to location to the model vehicle.

In another preferred embodiment, the disclosed system, further comprising wherein at least the positioning system and the communication system as well as the control module are connected to a personal computer, wherein software specifically adapted to the system runs on the personal computer.

In a preferred embodiment, a model vehicle for the disclosed system, comprising (i) an energy self-sufficient drive, (ii) a signal transmitter, (iii) a control unit, and (iv) at least one communication receiver connected to the control unit.

In another preferred embodiment, the disclosed vehicle, further comprising a communication transmitter.

In another preferred embodiment, the disclosed vehicle, further comprising wherein the control unit is connected to the signal transmitter.

In another preferred embodiment, the disclosed vehicle, further comprising wherein the control unit is suitably designed to activate the drive in a plurality of speed levels according to information received via the communication receiver.

In another preferred embodiment, the disclosed vehicle, further comprising wherein the control device is suitably designed to activate a plurality of light generators and/or sound generators according to information received via the communication receiver.

In another preferred embodiment, the disclosed vehicle, further comprising wherein the control unit is suitably designed to transmit information about a current status of the model vehicle to the communication transmitter.

DETAILED DESCRIPTION OF THE INVENTION

Figure 1:
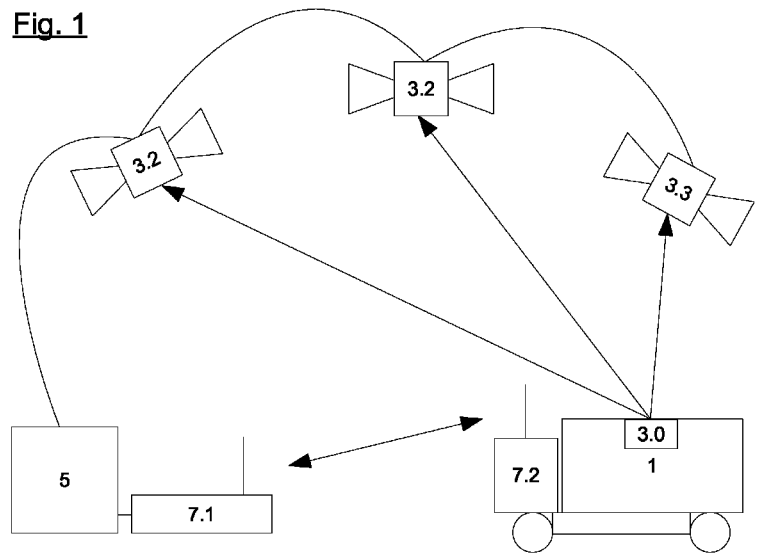
FIG. 1 is a schematic diagram of the inventive system.

We disclose herein an inventive system for operating model vehicles having at least one model vehicle with an energy self-sufficient drive and a steering axle which, with the aid of a magnet, follows a contact wire laid directly under a road, and a control module, wherein a positioning system for the model vehicles and a wireless communication system for transmitting information to the vehicle and/or from the vehicle are provided.

By providing a positioning system for the model vehicles, a positioning of the model vehicle on the designated road network that is accurate to the millimeter is possible. The wireless communication system enables transmission of information into the vehicle so that, based on the information transmitted in conjunction with the position detected from the positioning system, locationally-dependent actions become possible, such as for example, blinkers, horns or adjustment of the driving speed. By comparing the positioning information about a plurality of model vehicles, it is additionally possible to implement right of way regulations, such as for example, right before left, secondary street versus primary road, or vehicle-specific right of way regulations (fire department always has the right of way). By using the positioning information, it is also possible to realize vehicle-related distance control, so that following vehicles, in contrast to the distance regulation known from the prior art described above, adjust their distance to the model vehicle driving in front, not by using a time-controlled idle state, but instead approaching the vehicle driving in front and, by means of an adjustment of the driving mode, following said vehicle in a convoy.

The positioning system has at least one signal transmitter and a plurality of signal receivers for determining the position of the individual vehicles, wherein the signal transmitter is respectively assigned to a model vehicle and a position of the respective vehicle takes place by evaluating the time differences of a signal emitted by the signal transmitter to the signal receivers.

A positioning system of this type is especially easily-realized based on ultrasonics. Designs that are based on lasers or on radar are possible, but technically more complex.

In this case, an ultrasonic transmitter is assigned to each model vehicle, which transmitter emits an ultrasonic signal for example periodically or triggered by a control module, which signal is then received by preferably three signal receivers, for example ultrasonic receivers, and with the aid of an evaluation electronics is translated into a position of the model vehicle.

The communication system is preferably designed as radio-based; however, it can also be designed based for example on infrared or ultrasonic. A radio-based variant of the communication system has, however, the advantage that crosstalk from the positioning system can be avoided. Also, a radio-based variant has an advantage over infrared-based communication systems since infrared-based systems can become inoperable due to intensive solar radiation or other light influences.

The communication system has at least one stationary component and at least one mobile component, wherein the stationary component is connected to the control module and the mobile component is assigned to the model vehicle. In the case of larger model layouts, it can also make sense to distribute a plurality of stationary components across the layout so that a connection is ensured at all possible positions on the model layout.

In order to be able to transmit information to the model vehicle as well as to receive information from the model vehicle, it makes sense if the communication system is designed bidirectionally. In the case of a bidirectional design of the communication system, the stationary components as well as the mobile components are respectively designed as transmitters and receivers.

In order to reduce the number of necessary components, and in order to achieve the best possible system integration, it makes sense if the control module is connected to the positioning system and is suitably designed to link information about a road network and information from the positioning system with each other and to activate the model vehicle via the communication system based on this information. In this way, it achieves that, for example, stopping points, traffic lights, or local speed limitations, which can all be provided as information about the road network, are translated by the model vehicles.

In a preferred development, the control module is also suitably designed to implement the control of a model vehicle based on information about other model vehicles. In this way, a distance regulation between vehicles following one another can be realized, or a right before left regulation, or a right of way regulation for fire department or other emergency vehicles with emergency lights.

Ideally, the control module is suitably designed to activate a plurality of model vehicles, that is, that at least 10, preferably however at least 40 model vehicles can be controlled by one control module.

The control module as well as the corresponding components in the model vehicle are preferably designed in such a way that an activation of a plurality of driving modes, preferably more than 10 running modes, is possible via the communication system. In this way, realistic acceleration and braking behaviors of the vehicles can be achieved, as well as a situationally appropriate adjustment of running mode, for example, a slower drive during uphill sections.

A model vehicle for a system of this type has an energy self-sufficient drive as well as a control unit, wherein a signal transmitter and at least one communication receiver, which is connected to the control unit, are provided. The model vehicle can receive control signals via the communication receiver from a control module and/or from a transmitter connected to the control module, and transmit the control signals to the control unit for further processing. The control unit can then for example trigger a running mode of the drive or other vehicle-related actions.

If a communication transmitter is additionally provided, it is also possible that the control unit for its part can transmit information to the communication transmitter, for example, about the load status of the energy storage used in the model vehicle, for example, lithium polymer accumulators, or about the current running mode of the vehicle so that this information can be transmitted to the control module via the communication transmitter.

Preferably, the signal transmitter is also connected to the control unit. In this way it can be achieved that a signal about the positioning of the model vehicle is emitted not only at periodic intervals but also on command. Thus, depending on positioning or speed, for example, an increased frequency of emissions of a positioning signal can be provided.

In a preferred embodiment of the model vehicle, the control unit is suitably designed to activate the drive in a plurality of speed levels according to information and/or commands received via the communication receiver. A position-dependent speed limitation, a distance regulation, or a slow approach to an intersection can be achieved by an embodiment of this type.

In a further preferred embodiment of the inventive model vehicle, the control unit is suitably designed to activate a plurality of light generators and/or sound generators according to information received via the communication receiver. It can also be achieved through these measures that for example a fire department vehicle travels only in the region of intersections and only on the way to an emergency position with a special signal, that means warning lights and siren, while in contrast the return trip takes place without these additional signals. The same function can additionally be used so that turning vehicles signal in the region of intersections or turnoffs and/or an engine sounds are generated that are adjusted to a running mode.

As already indicated, it is advantageous if the control unit is suitably designed to transmit information about a current status of the model vehicle to the communication transmitter, that means to give feedback to a control module as to which status, for example, a load status of the batteries, or in which running mode the respective model vehicle finds itself at the moment.

It would be conceivable, for example, as further additional functions to provide an orientation sensor by means of which then an "accident message" could be emitted upon a vehicle tipping over.

In a further development of the proposed system as well as the proposed model vehicle, a fully autonomous driving of the model vehicle can be achieved in addition by providing a steering drive. Based on the large computer performance necessary for this as well as the considerable calculation expense within the vehicle, a use of the system with autonomously driving model vehicles does not appear to be sensible at this time.

The present invention will be subsequently explained in more detail based on an embodiment with reference to the figures included.

DETAILED DESCRIPTION OF THE FIGURES

FIG. 1 shows a schematic representation of a system for operating model vehicles 1 having a positioning system 3 as well as a wireless communication system 7. In the structure of the system represented schematically in FIG. 1, only one model vehicle 1 is represented, wherein due to reasons of clarity, a representation of the road was foregone.

Model vehicle 1 with an energy self-sufficient drive and a steering axle, which with the aid of a magnet follows a contact wire laid directly under a road, as well as a correspondingly equipped road, are sufficiently known and therefore require no more detailed description.

The model vehicle 1 has on the one hand a signal transmitter 3.0, which is designed as an ultrasonic transmitter in the present embodiment. Sound waves emitted by the ultrasonic transmitter 3.0 are received by signal receivers 3.1, 3.2, 3.3, which are designed as ultrasonic receivers in the present embodiment and are arranged for example on a roof above the road of the model vehicles 1. Based on time differences, which the received signal has at the individual signal receivers 3.1, 3.2, 3.3, a control module 5 or an evaluation unit separately assigned to the positioning system 3 can calculate a position of the model vehicle 1.

The positioning system 3 is connected to the control module 5, which links the position information determined by the positioning system 3 to information about the road network. Information of this type about the road network can comprise, in addition to a network map, for example, information about right of way regulations as well as other predetermined traffic regulations, for example, average predetermined speeds.

The control module 5 is additionally connected to a stationary component 7.1 of a communication system 7. The communication system 7 has additionally a mobile component 7.2, which is assigned to the model vehicle 1. In a simple configuration of the communication system 7, this is designed as unidirectional, that means that information is only transmitted from the stationary component 7.1, which is then designed as a transmitter, to the mobile component 7.2, which is then designed as a receiver.

As indicated in FIG. 1, however, it is preferred if the communication system 7 is designed bidirectionally. In the case of a bidirectional design of the communication system 7, the stationary component 7.1 as well as the mobile component 7.2 are respectively designed as transmitters and receivers. In this way, it is possible that information can be transmitted to the model vehicle 1 as well as from the model vehicle 1.

A bidirectional connection between the control module 5 and the model vehicle 1 has the additional advantage that, for example, information can be transmitted about a load status of an energy supply used in the model vehicle 1, or feedback about the set running mode, as well as, if necessary, orientation information about the model vehicle 1. In this way, it can be checked whether, for example, a command for changing the running mode in model vehicle 1 has arrived or whether the respective model vehicle 1 had an accident, for example, based on changed orientation information.

Based on the position information, in conjunction with information about the road network, positioning-related control commands, for example, can be transmitted from the control module 5 to the model vehicle 1. Positioning-related control commands of this type can, for example, relate to an activation of light signals, for example, setting a blinker prior to a turning procedure, or control commands relating to the running mode of the model vehicle 1. It is possible using radio transmission between the control module 5 and the model vehicle 1 to set a plurality of running modes that can be called up via a control unit 10, arranged in the model vehicle 1. In this way it is additionally possible, by linking the position information of a plurality of model vehicles 1, to undertake the implementation of right of way regulations as well as distance regulations between model vehicles 1 following one another. In this case, the running mode of a following model vehicle 1, which approaches a proceeding model vehicle 1 at a higher speed, can be adjusted in a realistic way by comparing the position information of an actual speed determined from the position information of the model vehicle 1 and adjusting the running mode of the following model vehicle 1.

By calling different running modes following one after the other, realistic acceleration and braking behaviors can be represented for the model vehicle 1. For this purpose, for example prior to intersections, monitoring of the position information can take place at increased frequency, by which means then commands for increasing and/or decreasing the respective running mode of the model vehicle 1 are dynamically transmitted from the control unit 5. It is, however, basically simpler, if transition characteristic curves are used in the control unit 10 for transitions between the callable running modes. In this way, realistic acceleration and braking behaviors of the model vehicle 1 can be especially easily represented.

An additional, interesting application case arises for model vehicles 1 with special signals, for example, siren and/or emergency lights. It is possible for model vehicles 1 of this type to recreate these emergency situations in a realistic way and manner by means of the communication system 7. Thus, for example, a fire department vehicle under complete special signal, which means with activated emergency lights and activated siren, can travel to an emergency location, deactivate the siren at the emergency location and, upon completion of the respective emergency, return to its base without the emergency lights. A similar regulation can arise for example for the speeds traveled, wherein the vehicle could then travel at increased speed to the emergency location and return from the emergency to the base at normal speed.

Figure 2:
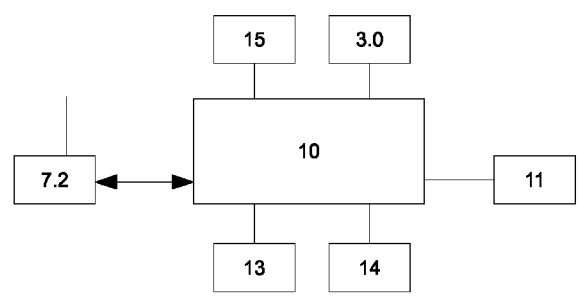
FIG. 2 is a block diagram of the components used in the model vehicle.

FIG. 2 shows a block diagram of the components used in the model vehicle.

The central feature of the components used in the model vehicle 1 is the control unit 10, which is connected to a drive 11, the signal transmitter 3.0, one or more light generators 13, as well as a sound generator 14. The control unit 10 is in bidirectional connection to the mobile component 7.2 of the communication system 7, so that control commands transmitted from the control module 5 via the stationary component 7.1 of the communication system 7 transmit to the control unit 10, and information about the other components 3.0, 11, 13, 14, 15 individually connected to the control unit 10 can be transmitted to the control module 5. The signal transmitter 3.0 can emit positioning signals for positioning the model vehicle 1 either as an autonomous system at periodic intervals, that means as ultrasonic signals in the preceding example, or can undertake a transmission of said positioning signals triggered by the control unit 10. The control unit 10 can for example be designed as a microcontroller. Microcontrollers of this type are broadly disseminated and thus well tested in the field of train, signal, and point setting in model trains. The most commonly known microcontrollers function according to the DCC protocol (DCC=digital command control), the Motorola protocol, or the Selectrix protocol.

However, other protocols and microcontrollers are also conceivable, specifically adapted for the requirements of model vehicles with energy self-sufficient drives.

LED modules can be provided as light generator 13, for example to implement blinkers, brake lights, driving lights, and emergency lights.

The sound generator 14 can for example be suitably designed to generate emergency signals for emergency vehicles; however, it can also be designed for all vehicles for example for implementing horn noise, or engine noises that can then be adjusted to the different running modes of the drive 11 as well as to the type of vehicle.

The previously described system enables in addition to a manual activation of all functions of the model vehicle 1, a programming of automatic programs for the individual model vehicles 1 as well, so that under consideration of the traffic regulations used for the street network, an interaction of the individual model vehicles 1 is enabled.

A special advantage of the system described here lies in the significantly lowered wiring expense, which is achieved by use of the communication system 7 as well as the positioning system 3. The wiring for a plurality of position repeaters and, for example, stopping points can thus be omitted.

A particularly elegant translation of all demands as well as a user-friendly presentation can be achieved by specifically coordinated software. A program of this type, which activates the individual components via the USB interface or via another suitable interface of a PC, can realize the processing of the information obtained as well as the control and visualization of the system. In particular, more complex automated programs can be designed and used in this way.

LIST OF REFERENCE NUMBERS

1 Model vehicle
3 Positioning system
5 Control module
7 Communication system
10 Control unit
11 Drive
12 Light generator
13 Sound generator
14 Energy supply
3.0 Signal transmitter
3.1 Signal receiver
3.2 Signal receiver
3.3 Signal receiver
7.1 Stationary component
7.2 Mobile component The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

I claim:

1. A system for operating model vehicles comprising:
   (i) at least one model vehicle with an energy self-sufficient drive and a steering axle, which, with the aid of a magnet, follows a contact wire laid directly under a road, (ii)

a positioning system for the model vehicles, (iii) a control module, and (iv) a wireless communication system for transmitting information to the vehicle and/or from the vehicle is provided, wherein the positioning system has at least one signal transmitter and a plurality of signal receivers, wherein the signal transmitter is assigned to a specific model vehicle and a position of the vehicle is calculated by evaluating time differences of a signal emitted from the signal transmitter to the signal receivers.

2. The system of claim 1, further comprising wherein the positioning system is based on ultrasonics.

3. The system of claim 1, further comprising wherein the communication system is based on radio.

4. The system of claim 1, further comprising wherein the communication system has at least one stationary component and at least one mobile component, wherein the stationary component is connected to the control module and the mobile component is assigned to a model vehicle.

5. The system of claim 1, further comprising wherein the control module is connected to the positioning system and is suitably designed to link information about a road network with information from the positioning system with each other and to activate the model vehicle based on this information via the communication system.

6. The system of claim 1, further comprising wherein the communication system is designed bidirectionally.

7. The system of claim 5, further comprising wherein the control module is suitably designed to implement the control of the model vehicle based on information about other model vehicles.

8. The system of claim 7, further comprising wherein the control module is suitably designed to activate a plurality of model vehicles.

9. The system of claim 5, further comprising wherein the control module is suitably designed to transmit control commands related to location to the model vehicle.

10. The system of claim 1, further comprising wherein at least the positioning system and the communication system as well as the control module are connected to a personal computer, wherein software specifically adapted to the system runs on the personal computer.

11. A model vehicle for the system of claim 1, comprising (i) an energy self-sufficient drive, (ii) a signal transmitter, (iii) a control unit, and (iv) at least one communication receiver connected to the control unit.

12. The model vehicle of claim 11, further comprising a communication transmitter.

13. The model vehicle of claim 11, further comprising wherein the control unit is connected to the signal transmitter.

14. The model vehicle of claim 11, further comprising wherein the control unit is suitably designed to activate the drive in a plurality of speed levels according to information received via the communication receiver.

15. The model vehicle of claim 11, further comprising wherein the control device is suitably designed to activate a plurality of light generators and/or sound generators according to information received via the communication receiver.

16. The model vehicle of claim 11, further comprising wherein the control unit is suitably designed to transmit information about a current status of the model vehicle to the communication transmitter.

\* \* \* \* \*